United States Patent
Carter

(10) Patent No.: US 6,676,265 B2
(45) Date of Patent: Jan. 13, 2004

(54) ELLIPSOIDAL MIRROR

(75) Inventor: Ralph Lance Carter, Oxon (GB)

(73) Assignee: PerkinElmer International C.V. (CH)

( * ) Notice: Subject to any disclaimer, the term of this patent is extended or adjusted under 35 U.S.C. 154(b) by 0 days.

(21) Appl. No.: 09/942,019

(22) Filed: Aug. 29, 2001

(65) Prior Publication Data

US 2002/0034025 A1 Mar. 21, 2002

(51) Int. Cl.$^7$ .............................. G02B 5/10; G02B 7/182
(52) U.S. Cl. ..................... 359/858; 359/861; 359/862; 359/863; 359/865; 359/730; 359/365
(58) Field of Search ................................ 359/365, 730, 359/858, 859, 861, 862, 863, 865, 872

(56) References Cited

U.S. PATENT DOCUMENTS

| | | | |
|---|---|---|---|
| 2,819,649 A | | 1/1958 | McLeod et al. |
| 2,944,156 A | * | 7/1960 | Davy et al. |
| 3,224,330 A | * | 12/1965 | Kompfner |
| 4,017,163 A | * | 4/1977 | Glass |
| 4,161,351 A | * | 7/1979 | Thomas et al. |
| 4,239,342 A | * | 12/1980 | Aurin et al. |
| 4,357,075 A | * | 11/1982 | Hunter |
| 4,458,302 A | * | 7/1984 | Shiba et al. |
| 4,657,721 A | * | 4/1987 | Thomas |
| 4,858,090 A | * | 8/1989 | Downs |
| 4,993,818 A | | 2/1991 | Cook |
| 5,144,476 A | | 9/1992 | Kebo |
| 5,306,892 A | * | 4/1994 | Hohberg |

FOREIGN PATENT DOCUMENTS

GB     1132605    * 11/1968

OTHER PUBLICATIONS (Rah et al., "Four–spherical–mirror zoom telescope continuously satisfying the aplanatic condition", *Optical Engineering*, Sep. 1989, vol. 28. No. 1014–1018.

Woehl et al., "An all–reflective zoom optical system for the infrared", *Optical Engineering*, May/Jun. 1981, vol. 20, No. 3, pp. 450–458.).

European Search Report.

* cited by examiner

*Primary Examiner*—Ricky D. Shafer
(74) *Attorney, Agent, or Firm*—St. Onge Steward Johnston & Reens LLC

(57) ABSTRACT

An optical system capable of providing a magnification which can be varied comprises a pair of ellipsoidal mirrors [(20, 21)]which are so mounted and arranged that the focus for radiation reflected from one mirror corresponds substantially with the input focus for the other mirror. The mirrors are preferably mounted so that they are pivotable.

4 Claims, 2 Drawing Sheets

ELLIPSOIDAL MIRROR

This invention relates to optical systems capable of providing a magnification which can be varied.

Optical systems which can provide a variable magnification are often required and have been known for a long time. In the visible region of the electromagnetic spectrum, variable magnification optical systems have been implemented for many years using a series of lenses whose separations can be varied in order to change the magnification provided by the lens system. A problem with lens systems is that because of their refractive nature chromatic aberrations can occur and this type of lens system often requires a number of extra elements in order to overcome this problem. At wavelengths outside the visible region, for example in the infrared region, the number of materials which have the necessary transmission qualities to form such lenses is severely restricted and this restricted choice of material can have the effect of reducing the performance of the optical system that can be achieved over a range of wavelengths. Also the cost of the system is increased.

This problem has been dealt with in the past by constructing variable magnification optical systems entirely of mirrors. An advantage of a mirror system is that there is no chromatic abberation. However a disadvantage of many mirror systems is that each mirror generally works off axis and as a consequence aberrations occur and increase rapidly as the light propagates through the system of mirrors. Another disadvantage of many mirror systems is the complexity of the mechanical system that is required in order to move the individual mirrors in order to achieve a change in magnification. This arises because the mirrors are not positioned and moved on a common axis as in the case of lenses and the position of the mirrors has to be controlled in two rather than one dimension.

The present invention is concerned with an optical system which has been developed in order to deal with both the aberration and mechanical articulation problems associated with the prior art.

According to the present invention there is provided an optical system capable of providing a magnification which can be varied comprising a pair of ellipsoidal mirrors which are so mounted and coupled that the point at which radiation reflected from the first mirror is focused corresponds substantially with the input focus of the second mirror. The mirrors may be mounted for pivotable movement so that the angle between their axes can be varied.

The optical system may include a first pair of ellipsoidal mirrors and a second pair of ellipsoidal mirrors, said pairs of mirrors being so mounted and coupled that the output focus of the first pair corresponds substantially to the input focus of the second pair. The mirrors may be coupled by articulation means and the articulation between the output mirror of the first pair and the input mirror of the second pair is at the output focus of the first pair. The said point of articulation may be constrained to move along a predetermined path when the mirrors are moved in order to achieve a change in magnification.

The invention will be described now by way of example only, with particular reference to the accompanying drawings. In the drawings.

Figure 1:
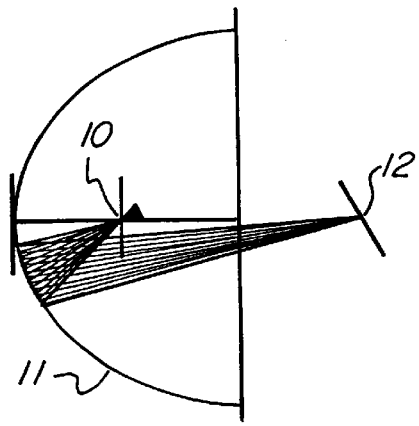
FIGS. 1 and 1a illustrate the operation of ellipsoid mirrors.
Figure 1A:
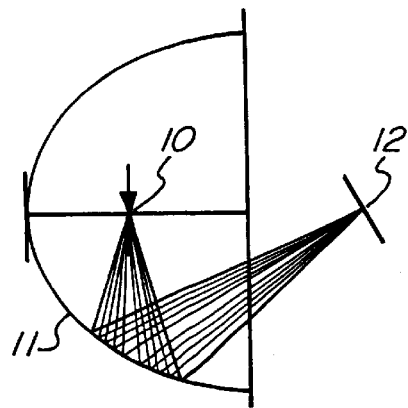

Embodiments in accordance with the present invention provide optical systems which have continuously variable magnification and are based upon the use of ellipsoidal mirrors. An ellipsoidal mirror has the property that any ray that passes through one of its foci will be reflected to emerge through its other focus. This is illustrated in FIGS. 1 and 1a of the drawings. An object placed at the focus (10) of the ellipsoidal mirror (11) will generate an image at the focus (12). The degree of magnification provided by the mirror varies in accordance with the angle at which the rays impinge upon the surface of the surface of the mirror. FIG. 1 shows an arrangement which can achieve high magnification, whilst the arrangement of FIG. 1a achieves a lower magnification. When using a single mirror such as the arrangements shown in FIGS. 1 and 1a, aberrations, which appear in the image, increase rapidly as the point at which the rays impinge upon the mirror moves away from the centre of the field. The rate of increase depends upon the f number of the mirror.

Figure 2:
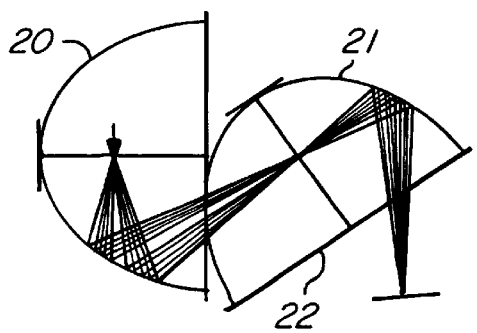
FIG. 2 illustrates schematically a first embodiment in accordance with the present invention.

A practical arrangement in which the problem of aberration can be reduced is illustrated in FIG. 2 of the drawings and is formed from two ellipsoidal mirrors (20 and 21). These mirrors are coupled together and so mounted that the output focus of the first mirror (20) coincides with the input focus of the second mirror (21), this point of coincidence being shown at (22). Furthermore, the second mirror (21) is so arranged that it reflects in the opposite sense to the first mirror (20). In such an arrangement, the magnification can be varied by adjusting the relative orientation of the mirrors in such a way that the entry angle of the light rays changes. A positive increase in ray entry angle to the first ellipsoidal mirror results in a lower magnification and this distorts the wavefront at the intermediate focus (22). This effect however is countered at the second ellipsoidal mirror as the change in entry angle tends to increase magnification. Thus, the wavefront is restored to a certain extent by the second mirror. The wavefront restoration is almost perfect when one ellipsoidal mirror has a magnification which is the reciprocal of the other. Thus, aberration is minimal when the system delivers unity magnification. However, aberration will grow relatively slowly as the system magnification is increased.

Figure 2A:
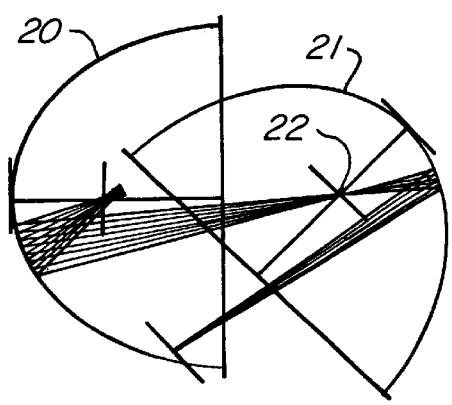
FIG. 2a illustrates the arrangement of FIG. 2a in a different configuration.

FIG. 2 shows the two ellipsoidal mirrors in a configuration which provides low magnification. FIG. 2a shows the two mirrors in a different configuration which provides a relatively high magnification.

It will therefore be seen that an optical system having continuously variable magnification can be constructed by arranging two ellipsoidal mirrors so that their baseplates are pinned together in such a way that the second focus of the first ellipsoid coincides with the first focus of the second ellipsoid. The magnification provided by such a mirror arrangement can be varied by changing the relative orientation of the mirrors so that the ray entry angle of light into the system is changed. For a given system magnification there will be an optimum pair of angles between the axes of the mirrors that achieves a minimal image aberration. However, maintaining a precise control of angle is not a necessary requirement.

Whilst a system as described above with reference to FIG. 2 can achieve satisfactory results, it does have a drawback in that the relative position and angle of rays into the system changes with respect to the output of the system. This may not be a problem if the image sensing device which is to receive the radiation of the second ellipsoidal mirror can be moved easily relative to the object, but there are some systems in which it is necessary to maintain a fixed spatial relationship between the object and the image. In such a system the arrangement, shown in FIG. 2, would not be satisfactory.

Figure 3:
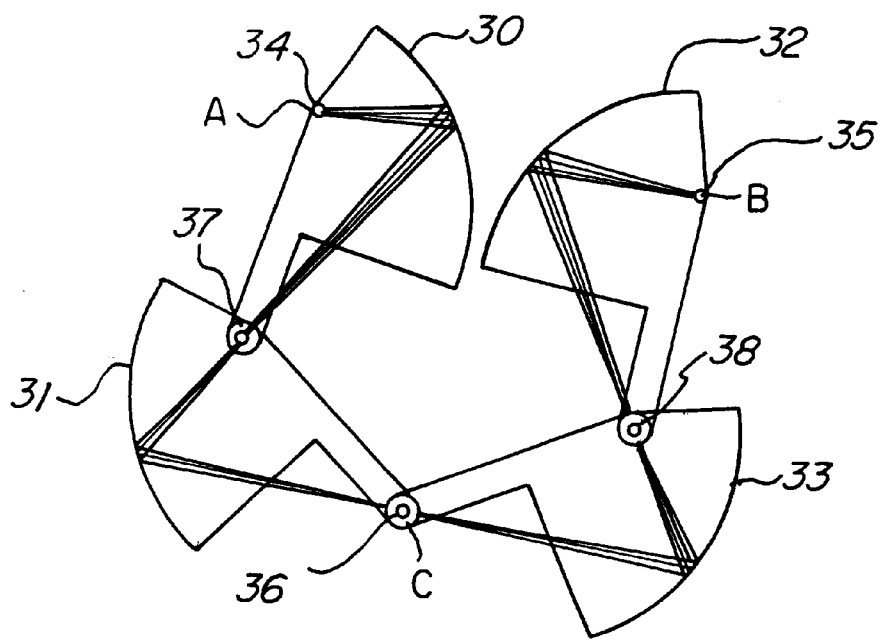
FIG. 3 illustrates another embodiment of the system in accordance with the present invention.
Figure 3A:
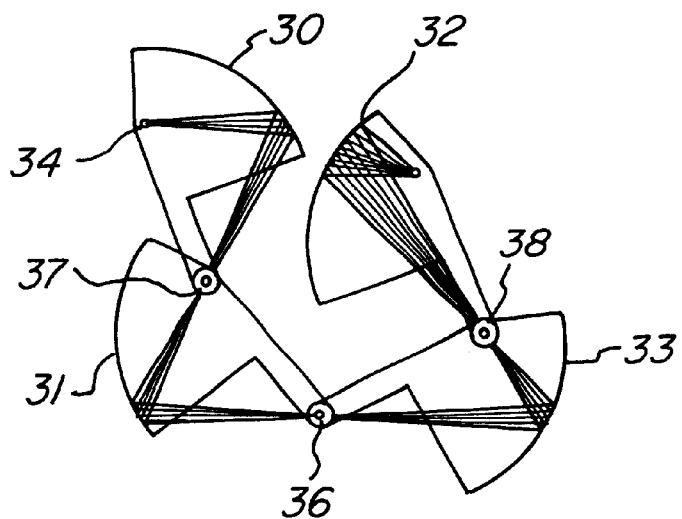
FIG. 3a shows the system of FIG. 3 in a different configuration.

The drawback referred to can be overcome by providing a mirror arrangement of the type shown in FIG. 3 of the drawings. FIG. 3 of the drawings illustrates a continuously variable magnification optical system comprising a first pair of ellipsoidal mirrors (30 and 31) and a second pair of ellipsoidal mirrors (32, 33). The mirror (30) is mounted upon a pivot (34) which is attached to the chassis of the optical system and the mirror (32) has a pivot point (35) which is also attached to the system chassis. The mirrors (31 and 33) have a common intermediate pivot point (36) which is capable of moving with respect to the chassis. In FIGS. 3 and 3a, reference point 37 is the image focus point for mirror 30 and the object focus point for mirror 31. Reference point 38 is the object focus point for mirror 32 and the image focus point for mirror 33.

In the arrangement shown in FIG. 3 the two pairs of mirrors are linked in such a way that the output focus of the first pair is pinned to the input focus of the second pair at point (36). This provides sufficient degrees of freedom to change the angles between the axes of the four mirrors whilst maintaining the output of the complete system at a fixed point relative to the system input. Furthermore, it is possible to arrange the geometry such that light rays from an object enter and exit at the same relative angle.

The pivot point (34) forms the input to the system and the pivot point (35) constitutes the output of the system. The pivot point (36) is arranged such that it can move along a predetermined optimal path in order to achieve different system magnifications. For any given system magnification there will be a position for the point (36) which gives the best aberration performance. In a practical arrangement this path will be a compromise between the optimal and what can be achieved by the particular mechanical system employed.

What is claimed is:

1. A variable magnification optical system comprising:

a first pair of ellipsoidal mirrors (30, 31) each having an axis and including:

a first input mirror (30) having an object focus point (34) and an image focus point (37);

a first output mirror (31) having an object focus point (37) and an image focus point (36);

wherein the first pair of ellipsoidal mirrors (30, 31) are positioned so that the image focus point (37) of the first input mirror (30) corresponds substantially with the object focus point (37) of the first output mirror (31);

a second pair of ellipsoidal mirrors (32, 33) each having an axis and including:

a second input mirror (33) having an object focus point (36) and an image focus point (38);

a second output mirror (32) having an object focus (38) point and an image focus point (35);

wherein the second pair of ellipsoidal mirrors (32, 33) are positioned so that the image focus point (38) of the second input mirror (33) corresponds substantially with the object focus point (38) of the second output mirror (32);

wherein the image focus point (36) of the first output mirror (31) is substantially the same as the object focus point of the second input mirror (33);

means for adjusting the relative position between the first and second pairs of ellipsoidal mirrors (31, 32, 33, 34), wherein the image focus point (36) of the first output mirror (31) is constrained to move along a predetermined path to achieve a change in magnification.

2. An optical system according to claim 1, wherein the mirrors are mounted for pivotable movement so that an angle subtended between the axes of the first and second pair of ellipsoidal mirrors (30, 31, 32, 33) can be varied.

3. An optical system according to claim 1, wherein the magnification of the first ellipsoidal mirror in each pair of mirrors is substantially the reciprocal of the magnification of the second ellipsoidal mirror in each pair of mirrors.

4. An optical system according to claim 1 wherein fight rays emanating from an object enter and exit the optical system at the same relative angle.

* * * * *